Jan. 22, 1957    G. L. FOGAL ET AL    2,778,308
PARACHUTE RELEASE MECHANISM
Filed Aug. 1, 1951    2 Sheets-Sheet 1

INVENTORS
G. B. BROWN
G. L. FOGAL
BY
ATTYS.

Jan. 22, 1957 G. L. FOGAL ET AL 2,778,308
PARACHUTE RELEASE MECHANISM
Filed Aug. 1, 1951 2 Sheets-Sheet 2
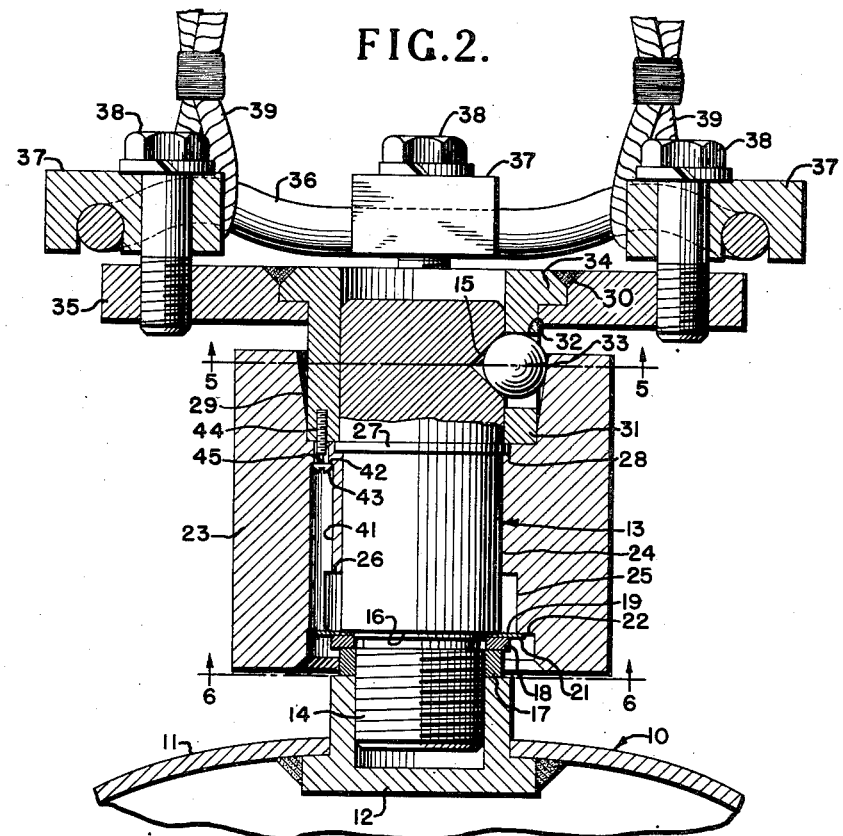
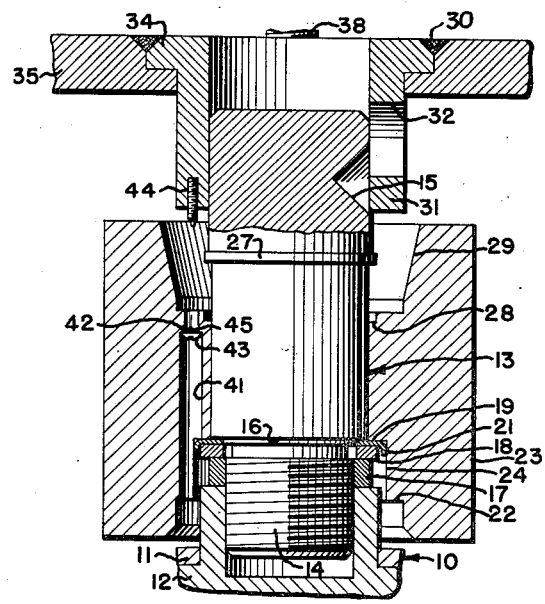
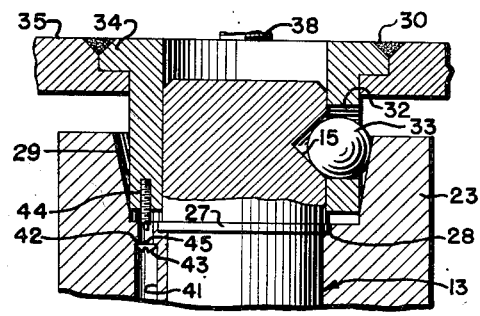
INVENTOR.
G. B. BROWN
G. L. FOGAL
BY
G. D. O'Brien
R. M. Hicks
ATTYS.

United States Patent Office 2,778,308
Patented Jan. 22, 1957

2,778,308
PARACHUTE RELEASE MECHANISM

Gordon L. Fogal, Silver Spring, Md., and Graham B. Brown, Ridgewood, N. J.

Application August 1, 1951, Serial No. 239,828

9 Claims. (Cl. 102—4)

(Granted under Title 35, U. S. Code (1952), sec. 266)

The present invention relates to apparatus for releasing a parachute from a load. More particularly the present invention relates to a parachute release mechanism having a ball locking device for securing a parachute to a mine and operable by movement of an inertia member upon impact of the mine with the surface of a body of water or the ground to release the parachute from the mine.

Prior art inertia operated parachute release mechanisms, with particular reference to the type which is clamped to the tail rim of a mine, have had the disadvantage of a high percentage of operational failures by reason of the tension applied to the inertia member in clamping the mechanism to the mine.

The present invention comprises a ball locking mechanism, the balls being retained in locking position by an inertia member in the form of a sleeve which is relieved of all strain of supporting the mine. The inertia member is held in ball retaining position by means, such, for example as a deformable washer. It is also within the province of the present invention to provide a pair of severable screws or other means for retaining the inertia member in a primary or safe position prior to the opening of the parachute and to release the inertia member to a secondary or armed position when the parachute opens. A second action occurs when the mine strikes the surface of a body of water or the ground, the inertia member moving to free the locking balls and thus the parachute assembly is released from the mine.

An object of the present invention is to provide a new and improved inertia operated parachute release mechanism in which the inertia member is relieved of load carrying strain.

Another object is to provide a new and improved inertia operated parachute release mechanism for an aircraft launched marine mine which will prevent premature release of the parachute and which is positive in releasing action when the mine strikes the surface of a body of water.

Still another object is to provide a new and improved parachute release mechanism which is simple to make and durable in service.

A further object is to provide a new and improved ball locking parachute release mechanism for a marine mine in which the locking components are held in an initial retaining or safe position until the parachute is opened and in an armed or ball locking position thereafter until the mine strikes a body of water whereupon the parachute is released from the mine.

Other objects and many of the attendant advantages of this invention will be readily appreciated as the same becomes better understood by reference to the following detailed description when considered in connection with the accompanying drawings wherein:

Fig. 2 is a sectional view taken along line 2—2 of Fig. 1;

Fig. 3 is fragmentary sectional view similar to Fig. 2 and showing the position of the ball locking mechanism after the parachute has opened;

Fig. 4 is a sectional view similar to Fig. 2 and showing the ball locking mechanism released by the inertia member as the mine strikes the surface of a body of water;

Figure 1:
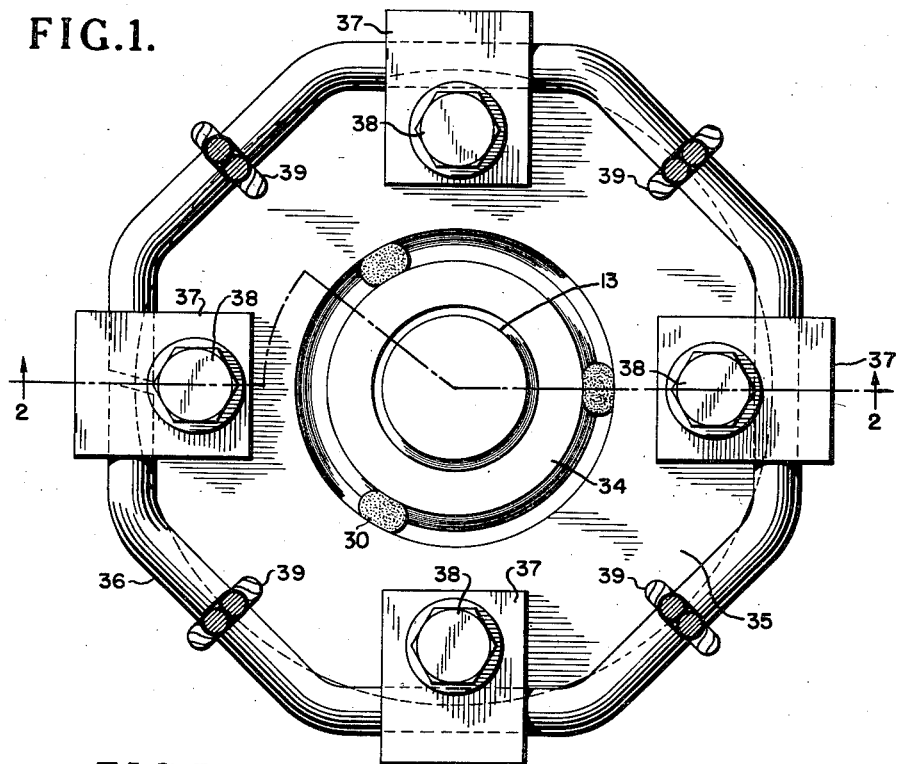
Fig. 1 is a top plan view of the device of the present invention.
Figure 5:
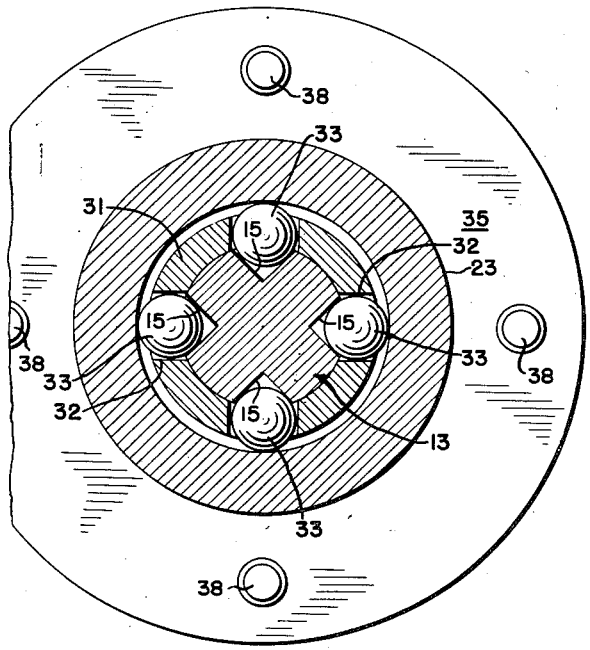
Fig. 5 is a sectional view taken along line 5—5 of Fig. 2.

Referring more particularly to the drawings wherein like numerals indicate like parts throughout the several views, the numeral 10 indicates generally a mine having a tail cover plate 11. An internally threaded socket 12 is welded or otherwise firmly secured to the cover plate 11. A stud indicated generally at 13 has an extension 14 threadedly mounted in socket 12. Adjacent the opposite end of the stud 13 and spaced around the sides thereof is a plurality of conical bores 15. Stud 13 is provided adjacent the extension 14 with a shoulder 16. Interposed between the shoulder 16 and socket 12 is a nut 17 threadedly engaging the stud 13, a conventional washer 18 having an outer diameter greater than stud 13, and a deformable washer 19 having a plurality of tabs 21 engaging the shoulder 22 of inertia member 23. It is, of course, understood that the number of tabs may be changed to vary the amount of inertia force required to release the inertia member 23.

Inertia member 23 which is provided with an axial bore 24, slideably receives the stud 13. The bore 24 has an enlarged portion at 25 extending from shoulder 22 to the shoulder 26, with the distance between shoulders 22 and 26 governing the amount of movement of member 23 toward the mine 10 when released by the tabs 21.

Stud 13 is also provided with a circumferential bead or ring 27 which is integral therewith. Ring 27 engages shoulder 28 of member 23 to prevent motion of member 23 away from mine 10. Member 23 is provided with another enlargement of bore 13 at the end thereof opposite to enlargement 25 as indicated at 29 and which is tapered slightly toward the outer edge thereof.

Interposed between bore 29 and the end of stud 13 is a tubular member or retainer ring 31, member 31 being provided with a plurality of elongated radial bores 32. Nested in conical bores 15, elongated bores 32, and bearing against the tapered sides of bore 29 is a plurality of balls 33, each of the balls 33 being individual to each pair of bores comprising bores 15 and 32. Tubular member 31 has formed on one end thereof a circular flange 34 which is welded at 30 or otherwise secured to ring 35. Secured to ring 35 is a shroud line supporting ring 36, the ring 36 being engaged by grooved lugs 37 secured by bolts 38 to ring 35. The shroud lines 39 of the parachute are secured to ring 36.

Figure 6:
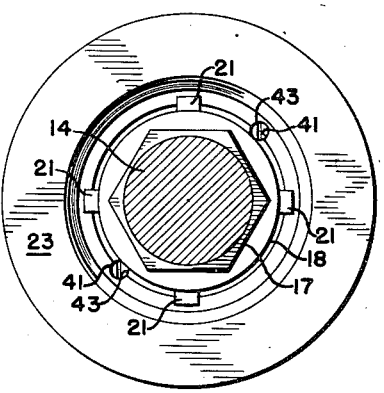
Fig. 6 is a sectional view taken along line 6—6 of Fig. 2.

As shown in Figs. 2, 3, 4 and 6 the inertia member 23 is provided with a pair of diametrically opposed longitudinal bores 41 positioned adjacent bore 24, the bores 41 having shoulders 42 adjacent one end thereof to receive the heads of screws 43 threadedly engaging bores 44 in member 31. Screws 43 may be weakened as at 45 to cause breakage thereof upon application of a predetermined amount of force thereon.

In operation, as the parachute opens, the screws 43 receive the force thereof and break at the weakened portions 45. The retainer ring moves away from the initial position thereof the distance of the play of balls 33 in bores 32. The release mechanism remains in the aforementioned moved position, which is the armed position until the mine strikes the surface of a body of water or the ground whereupon inertia member 23 is forced by inertial action to bend the tabs of washer 19, and to move a sufficient distance to release the balls 33 from bores 15 and 32 and to release retainer 31 from stud 13, thus releasing the parachute from the mine.

It will thus be apparent that the present invention provides a parachute release mechanism which, in the initial position, relieves the ball lock of retaining the separable portions thereof together and, in the armed position, the ball lock assumes the support of the mine beneath the parachute, the balls bearing against a tapered wall of the inertia member to reduce the tendency of the balls to prevent motion of the inertia member by friction when the mine strikes a body of water.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. Apparatus for releasing a parachute from an aerial launched mine comprising, in combination, a tubular member, means for connecting said tubular member to said parachute, a stud member secured to said mine, means for releasably locking said tubular and stud members together, inertia means encircling said tubular member for retaining said locking means in locking engagement with said tubular and stud members, and a deformable washer secured to the stud member for maintaining said inertia means in retaining position, said inertia means deforming said deformable means and releasing the locking means under force of impact as the mine strikes the surface of a body of water.

2. Apparatus for releasing a parachute from an aerial launched mine comprising, in combination, a tubular member secured by shroud lines to said parachute, a stud secured to said mine and nested in said tubular member, ball locking means for maintaining said stud means in said tubular member, inertia operated means for maintaining said ball locking means in locked position, and a deformable washer secured to said stud for retaining said inertia operated means in ball retaining position until the mine strikes the surface of a body of water.

3. Apparatus for releasing a parachute from an aerial launched marine mine upon impact of the mine with the surface of a body of water comprising, in combination, means including a tubular member secured to said parachute, said tubular member having a plurality of elongated openings in the tubular walls thereof, a stud member having a plurality of shallow conical bores therein in radial alignment with said openings, a plurality of balls mounted respectively in pairs of said aligned bores and openings, said balls being of lesser diameter than the elongation of said openings and of sufficient diameter to nest in said conical bores and to extend laterally through and a distance beyond said openings, an inertia member sleeved about said tubular and stud members for maintaining said balls in said openings and said bores, severable screw means for securing the inertia and tubular members together and for releasing the inertia and tubular members as the screw means is severed by force of the openings of the parachute, said inertia and tubular members moving in opposed directions respectively a distance equal to the clearance between the balls and the ends of the elongated openings, a deformable retaining washer secured to said stud member for maintaining said inertia member in engagement with said balls when the screw means has been severed, said retaining washer being deformed as the inertia member moves under force of said impact to release said balls thereby to release the parachute from the mine.

4. Apparatus for releasing a parachute from an aerial launched mine comprising, in combination, a ring connected to said parachute by a plurality of shroud lines, a member having a depending tubular extension and secured to said ring, said tubular extension having a plurality of openings formed therein, a stud member secured to said mine and initially telescopically engaging said tubular member, said stud member having formed therein a plurality of shallow conical bores, a plurality of balls initially nested in said openings and said bores, an inertia member sleeved about said tubular member and said stud member, said inertia member having a slightly tapered internal bore for retaining said balls in said openings and said bores whereby the tubular member and the stud member are held against relative movement, and means for releasably retaining said inertia member, said inertia member moving past said retaining means for releasing said balls to cause separation of the tubular and stud members thus freeing the parachute from the mine under force of impact as the mine strikes the surface of a body of water.

5. An impact operated parachute release mechanism for an aerial launched mine comprising, the combination of, a socket member secured in the tail plate of said mine and extending therefrom, a stud threadedly engaging said socket member and extending rearwardly of said mine, said stud having a shoulder spaced with respect to said socket, a washer secured to said stud and engaging said shoulder, said washer having a plurality of outwardly extending tabs, a hollow cylindrical inertia member slideably mounted on said stud, said stud having means for limiting motion of said inertia member in a direction away from said mine, the tabs of said washer engaging said inertia member initially to prevent motion of the inertia member and to release the inertia member as the tabs are forced aside by the inertia member upon impact of the mine striking a body of water, a flanged tubular member having the shroud lines of the parachute attached thereto and sleeved on said stud and having a plurality of elongated slots in the side walls thereof, said stud having a plurality of conical bores initially in alignment with the bores in said tubular member, said inertia member having a channeled portion for securing said tubular member, a plurality of balls respectively positioned in said elongated bores and said conical bores and retained therein by said inertia member, a severable screw initially connecting together said inertia member and said tubular member and severable to release said members when said screw momentarily assumes the load of the mine as the parachute is opened, said balls initially contacting the upper end of said elongated slots and when said screw is severed contacting the lower end of said slots thus assuming the load of the mine, said inertia member moving to release said balls and thus releasing the parachute from the mine under force of said impact.

6. Apparatus for releasing a parachute from an aircraft launched marine mine comprising, in combination, means including a tubular member secured by shroud lines to said parachute, stud means secured to said mine and inserted in said tubular member, ball means for releasably locking said stud means and said tubular member together, inertia means surrounding said stud means and said tubular member and retaining said ball means in locking position, severable means for releasably securing together said inertia means and said tubular member, said severable means being severed by shock of the opening of the parachute to release said inertia means from said tubular member, and a deformable washer for retaining said inertia means after the release thereof by the severable means until said mine strikes the surface of a body of water whereby the inertia member moves to deform said washer and to release said ball means to free the parachute from the mine.

7. An impact operated parachute release mechanism comprising, in combination, a mine having a tail plate, a parachute having one end of each of a plurality of shroud lines secured thereto, a collector ring having said shroud lines secured thereto at the opposite ends thereof, an attaching flange having a depending tubular portion at the axis thereof and having said collector ring secured to said flange, said tubular portion having a plurality of elongated slots therein, a stud secured to and extending from the tail plate of said mine and into said tubular portion, a plurality of locking balls, said stud having a plurality of shallow bores for receiving said balls, said balls also extending through said slots and being of less diameter than the length of said slots, a cylindrical inertia member having an axial bore therethrough, said inertia member having an enlarged outwardly tapered portion to said axial bore, the wall of said tapered portion retaining said balls in the elongated slots and the shallow bores, severable means for initially securing said inertia member to said tubular portion and severable by shock of the opening of the parachute to release said inertia member from said tubular portion, said balls preventing separation of the stud and tubular member when the severable means is severed, a deformable ring for holding said inertia member in retaining position with respect to said balls and for releasing said inertia member as the mine strikes the surface of a body of water.

8. Apparatus for releasing a parachute from an aerial launched mine comprising, in combination, a ring connected to said parachute by a plurality of shroud lines, a member secured to said ring and having a tubular extension depending therefrom, said tubular extension having a plurality of slightly elongated slots formed therein, a stud member secured to said mine and telescopically engaging said tubular member, said stud member having formed therein a plurality of shallow conical bores, an inertia member sleeved about said tubular and said stud members, severable means for initially securing together said tubular and said stud members, a plurality of balls mounted in said slightly elongated slots and extending into said conical bores at the inner sides thereof and engaging the inertia member at the outer sides thereof, deformable means for releasably securing the inertia member in engagement with said balls, said deformable means being deformed to release said inertia member by force of impact as the mine strikes the surface of a body of water.

9. Apparatus for releasing a parachute from an aerial launched marine mine comprising, in combination, a collector ring having the shroud lines of said parachute attached thereto, a ball locking mechanism having a plurality of balls and a pair of separable members, an inertia member for retaining the balls of said ball locking mechanism in locking relation with said separable members, one of said separable members being secured to said collector ring, the other one of said separable member being secured to said mine, and deformable means for maintaining said inertia member in retaining relation with said balls and to release said inertia member as the inertia member moves under force of impact sufficient to deform said deformable member.

References Cited in the file of this patent

UNITED STATES PATENTS

| | | |
|---|---|---|
| 2,502,097 | Linder | Mar. 28, 1950 |
| 2,562,459 | Hoey | July 31, 1951 |
| 2,565,470 | Brown | Aug. 28, 1951 |